UNITED STATES PATENT OFFICE.

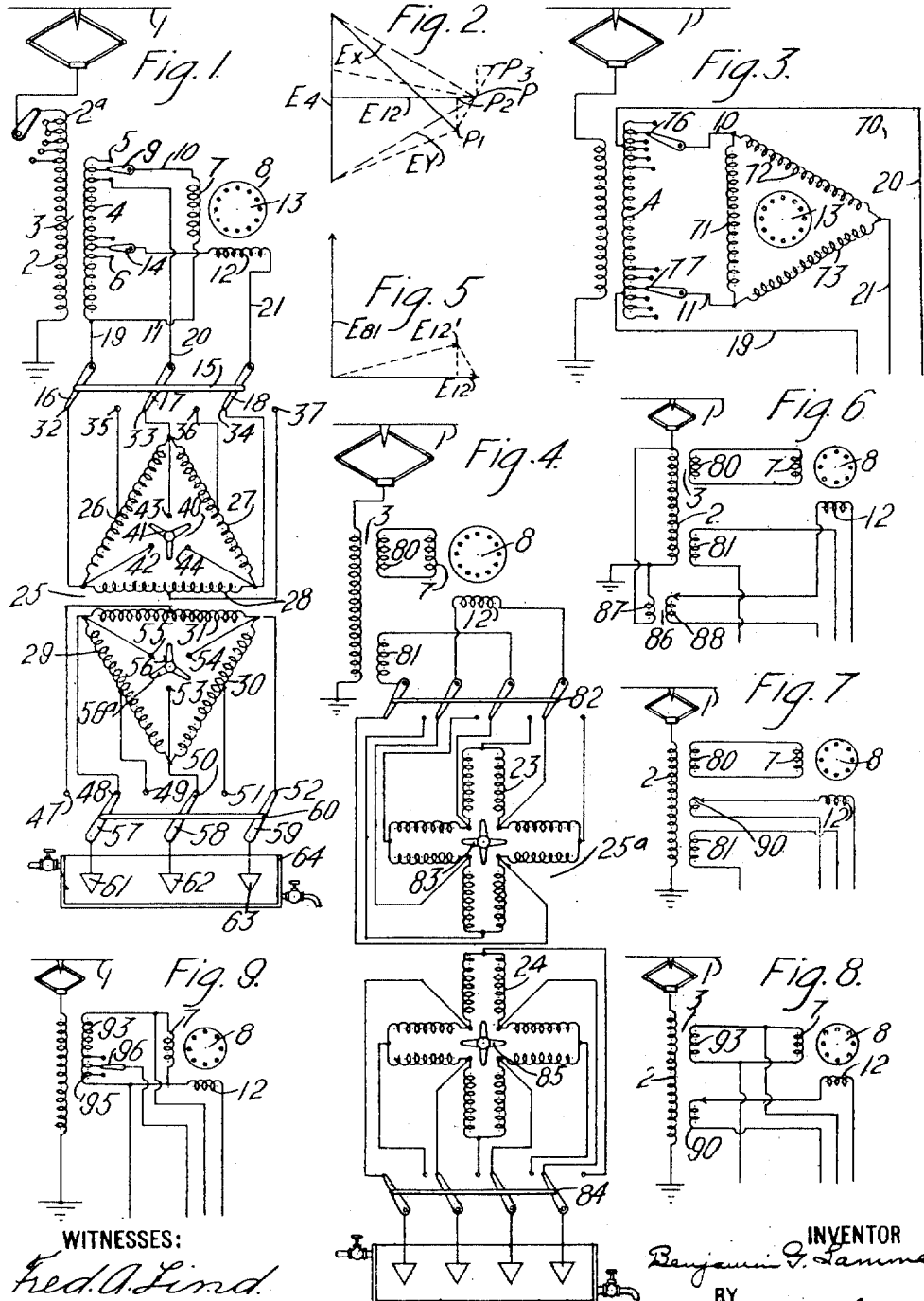

BENJAMIN G. LAMME, OF PITTSBURGH, PENNSYLVANIA, ASSIGNOR TO WESTING-HOUSE ELECTRIC AND MANUFACTURING COMPANY, A CORPORATION OF PENNSYLVANIA.

SYSTEM OF DISTRIBUTION AND CONTROL.

1,243,430.  Specification of Letters Patent.  Patented Oct. 16, 1917.

Application filed December 26, 1913. Serial No. 808,714.

*To all whom it may concern:*

Be it known that I, BENJAMIN G. LAMME, a citizen of the United States, and a resident of Pittsburgh, in the county of Allegheny and State of Pennsylvania, have invented a new and useful Improvement in Systems of Distribution and Control, of which the following is a specification.

My invention relates to systems of alternating current distribution and to control systems for alternating current motors, and it has special reference to the control of railway polyphase induction motors which are adapted to receive energy from a single phase system of distribution.

One of the objects of my invention is to simplify and improve the arrangement and operation of combined single and polyphase systems, whereby material reductions in the cost of installation, maintenance and operation are effected.

Another object of my invention is to provide a combined system of the above indicated character, whereby the advantages of construction and operation of single phase distributing systems and polyphase induction motors may be united in a single system.

My invention has for a further object to provide a system of control for railway motors which may be readily adapted for multiple unit operation of electric locomotives employed upon railways or electrified railroads having heavy grades and congested traffic where severe service conditions are encountered and where economies in operation may be realized by regeneration of energy to the distributing system on down grades.

A still further object of my invention is to provide means for converting single phase energy into two phase energy and for combining the same to produce three phase energy for operating three phase induction motors, and moreover to provide simple and ready means for adjusting the circuit connections to compensate for the phase displacement and for the changes in voltage of the phase converting means under different conditions of load upon said motors and to thus insure balanced operating conditions at all times.

Moreover, I contemplate a system of the general character referred to, which shall include provisions for increasing the torque of the driving motor temporarily in emergencies when abnormally heavy duty is required.

I believe that, broadly considered, my invention is susceptible of various forms, and, while I shall set it forth in connection with relatively few and simple systems, I contemplate many modifications thereof which fall within the scope of the appended claims.

My invention may best be understood by reference to the accompanying drawings, in which Figure 1 is a diagrammatic view of a system of distribution and control embodying my invention and in which single phase energy is converted into three phase energy for operating a three phase motor, Fig. 2 is a vector diagram showing the relation of certain of the electro-motive forces of the system shown in Fig. 1, Fig. 3 is a modified arrangement of my invention in which a three phase converter is employed, Fig. 4 is a diagrammatic view similar to Fig. 1 illustrating a modification of my invention for converting single phase energy into two phase energy for operating a two phase motor, Fig. 5 is a diagram of the same class as shown in Fig. 2, and Figs. 6, 7, 8 and 9 are diagrams of further modifications of my invention, in which single phase energy is converted into two phase energy and the phase distortion of the converted energy is compensated for in different ways.

Referring to Figs. 1 and 2, a supply circuit 1, such as a trolley of a railway system, delivers single phase energy to a primary winding 2 of a transformer 3 which is provided with a secondary winding 4 having a plurality of end taps 5 and intermediate taps 6, the latter being located at substantially the mid-point of the winding. The secondary winding 4 is connected to an exciting winding 7 of a phase converter 8 through an adjustable switching device 9 and conductors 10 and 11.

The phase converter 8 embodies a plurality of windings 7 and 12 which are disposed in quadrature relation upon the stationary portion of the converter, and is provided with a rotatable secondary member 13, preferably of the squirrel-cage type. The converter 8 therefore constitutes a form of two phase induction motor having one of its windings excited in phase with the source of single phase energy, while its other winding is adapted to deliver energy displaced substantially 90° with respect to the source.

The value of the electro-motive force of the converter winding 12 may be varied by varying the excitation of the winding 7 through the switching device 9, and, if this electro-motive force be made substantially 86.6% of that of the secondary transformer winding 4, it is evident that the voltages of the winding 4 and winding 12 may be combined to produce balanced three phase voltages by connecting the winding 12 to one of the intermediate taps 6 through a switching device 14. The connections just referred to, are similar to those of the well known "Scott" or T connections, and will be readily understood.

A switching device 15 has its respective movable contact members 16, 17 and 18 connected to the respective ends of the transformer winding 4 and converter winding 12 by conductors 19, 20 and 21, whereby three phase energy is available at the switching device 15 for whatever purpose desired.

A consideration of Fig. 2 will show the relationship of the electro-motive forces, just referred to, $E_4$ being the electro-motive force of the transformer winding 4 and in phase with the source of energy, and $E_{12}$ being the electro-motive force of the winding 12 of the phase converter 8 and which is at 90° to the voltage $E_4$. With this relationship and the voltage $E_{12}$ equal to substantially 86.6% of $E_4$, it is clear that the electro-motive forces $E_4$, $E_x$, and $E_y$ are equal and disposed at 120° from each other. Thus three phase energy of balanced electro-motive forces is produced from a single phase source of energy.

Inasmuch as my invention is particularly intended for railway systems and electrified railroads, a three phase induction motor 25 of the wound secondary type, is shown, having interconnected primary windings 26, 27, and 28 and similarly connected secondary windings 29, 30 and 31, both sets of which are normally connected in delta. The respective ends of the interconnected delta windings 26, 27 and 28 are electrically connected to stationary contact terminals 32, 33 and 34 of the switching device 15, while the mid points of said windings are respectively connected to contact terminals 35, 36 and 37. A switching device 40 comprises a multi-arm integral movable contact member 41 and coöperating stationary terminals 42, 43 and 44. The latter terminals are respectively connected to points of said windings 26, 27 and 28 corresponding to those to which contact terminals 32, 33 and 34 are connected.

The secondary windings 29, 30 and 31 are similarly connected to contact terminals 47, 48, 49, 50, 51, 52, 53, 54, and 55 and a switching device 56 having movable switch member 56$^a$, similar to member 41, and a switching device 60 having a plurality of contact members 57, 58 and 59 similar to 16, 17 and 18, are provided. The switching devices 15, 40, 56 and 60 are merely illustrative of apparatus for performing particular functions, and unit switches or other suitable devices may be used. The members 57, 58 and 59 of the switching device 60 are respectively connected to electrodes 61, 62 and 63 that are disposed within a tank 64 into which an electrolyte may be admitted. The electrodes 61, 62 and 63 and the tank 64 constitute a liquid rheostat for the purpose of varying the resistance of the circuit of the secondary windings of the motor 25 for effecting speed regulation. However, any form of adjustable resistance may be employed.

In electric railway operation, it is desirable to have a plurality of economical running speeds, and, in order to attain this end, the connections hereinbefore described with respect to the motor windings, are employed. As shown, the connections are such as to provide a certain number of poles, for instance eight, which determines the motor speed without resistance in the secondary winding. If, however, the switching devices 15, 60, 40 and 56 are moved to their other positions, the motor windings are so arranged that the number of poles is halved, resulting in double the speed under the same operating conditions.

It should be noted that the motor may, by the means described, be adapted for two different operating speeds, while the same motor windings are employed in both cases. This result is made possible by the use of interconnected motor windings in place of independent windings, in which case, it would be necessary to use two complete sets of motor windings, if the motors were adapted for different operating speeds. Therefore, the size and cost of the motors, as well as the motor losses, are much less than when motors having independent windings are utilized.

Assuming that the connections are as shown in Fig. 1 and that no electrolyte is admitted to the water rheostat 60, single phase energy is converted into three phase energy by the converter 8, in conjunction with the connections shown and described, and is supplied to the motor 25 which starts into operation. If the resistance of the motor secondary windings be gradually decreased by the admission of electrolyte into the liquid rheostat, the motor speed is gradually raised until the speed corresponds to the normal, synchronous speed with an eight-pole motor winding and the secondary member short circuited, which is one of the economical running positions.

In order to further increase the motor speed, the electrolyte is discharged from the tank 64 and switches 15, 60, 40 and 56 are thrown to their other operating positions. The connections are then such as to produce four magnetic poles and the speed may be gradually increased through the elimination of resistance in the secondary of the motor until the second economical running position is obtained.

It should be understood that during the motor operation, as the motor load is increased, there is a tendency for the electromotive force delivered by the winding 12 of the phase converter to be somewhat displaced in phase position by reason of the impedance of the apparatus, and to be reduced in amount. Any phase displacement, of course, that disturbs the initial balanced condition of the three phase voltages is undesirable. It is, therefore, necessary to provide means for compensating for any voltage reduction and phase displacement during varying conditions of load, which is accomplished by means of the switching devices 9 and 14.

Referring to Fig. 2, let it be supposed that, by reason of the load conditions, the point P of the diaphragm is moved to position $P^1$, which position depends upon the phase distortion of the electro-motive force of winding 12 of the converter, as well as its reduction in voltage.

The phase distortion may be corrected or compensated for by causing the movable contact member of the switching device 14 to make contact with the proper intermediate tap 6 located at one side of the mid-point of the winding 4. This adjustment of connections effects the desired result with respect to the phase distortion during motor operation. If, however, the motor 25 be acting as a generator for delivering energy back to the line, the adjustment of connections must be made on the opposite side of the mid-point.

Having compensated for the phase displacement, thus bringing the point P to position $P^2$, it is further necessary to raise the voltage of winding 12 again to its initial value to secure balanced electro-motive force. This voltage adjustment may be effected by increasing the excitation of winding 7 of the phase converter 8 through the switching device 9. Thus, it is seen that, by proper adjustments of the circuit connections, balanced electro-motive forces and loads upon the three phases may be secured throughout the operation.

During regeneration, the point P may be assumed to occupy a position $P^3$ when the phase distortion and variation of voltage is uncompensated. Normal balanced conditions of regeneration may, of course, be secured in a manner analogous to that already explained, and no description thereof will be given.

I have also made provision for meeting emergency demands when abnormal high-torque conditions obtain, by means of an auxiliary winding $2^a$ associated with the primary transformer winding 2, and which is provided with a plurality of taps or terminals to be engaged by a suitable switching device $2^b$ when desired. If the torque upon the motor be abnormally great, the switching device $2^b$ may be closed upon the proper lower tap to increase the secondary transformer voltage and that supplied to the motor 25, as will be understood. Inasmuch as the maximum torque of an induction motor varies as the square of the impressed voltage, it is clear that the desired results are accomplished. There is an incidental sacrifice of power factor by reason of the increased wattless component of power input, but this adjustment is only intended for emergency cases and will not be employed during normal operating conditions.

One specific embodiment of my invention, shown in Fig. 3, constitutes the subject-matter, in part, of my copending application, Serial No. 826,630, filed Mar. 23, 1914. A phase converter 70 embodies a plurality of delta-connected windings 71, 72 and 73 which constitute parts of the stationary member and a rotatable squirrel cage secondary member 13. The transformer secondary winding 4 is provided with a plurality of end taps 76 and 77 to which the conductors 10 and 11 may be connected as desired in order to properly energize the exciting winding 71 of the converter. Conductors 19 and 20 are permanently connected to the transformer secondary 4, and, under no-load conditions, balanced three phase electro-motive forces will be secured, if the conductors 10 and 11 are respectively connected to taps 76 and 77 corresponding to the points of connection of conductors 20 and 19, respectively, and conductor 21 is connected to windings 72 and 73 at their common point.

With load on the driving motor, however, a phase distortion and voltage reduction result, the former of which may be compensated by suitably adjusting the points of connection of conductors 10 and 11 an equal amount above the respective points of connection of conductors 20 and 19. Voltage increases may be secured by further adjustment of the upper adjustable conductor 10 in the same direction.

In order to concurrently compensate for both effects, it is, therefore, necessary to move the points of connection for both conductors 10 and 11 in the same direction at different rates. For regeneration, these compensations are effected by similar adjustments in the opposite direction.

Reference may now be had to Figs. 4 and 5, in which the transformer 3 is provided with a plurality of independent secondary windings 80 and 81, the former of which is connected across the exciting winding 7 of the phase converter 8, while the latter is connected to two separate poles of a switching device 82 corresponding to the device 15 shown in Fig. 1, except that it is adapted for two-phase circuits and is provided with four poles or movable contact members. The winding 12 of the converter 8 is connected to the remaining two poles of the switching device 82.

The induction motor 25ª, in this case, has both its members wound for two-phase operation, and its windings 23 and 24 are interconnected and adapted, by means of the switching devices 82, 83, 84 and 85, to be connected for different numbers of poles and operating speeds. The motor 25ª is, therefore, adaptable for two economical running positions, through the agency of means similar to those described with respect to Fig. 1. No provision is made herein for correcting for phase displacement and voltage reductions, and the relationship of the voltages supplied to the driving motor 25ª is shown in Fig. 5, $E_{81}$ and $E_{12}$ being 90° apart under no-load conditions.

Of course, the general mode of operation of the motor 25ª is similar to the operation already set forth, and it will be understood that, as the load increases, a phase distortion and voltage reduction results, thus producing a voltage $E_{12}^1$ and a consequent unbalancing of the load.

In the system shown in Fig. 6, an auxiliary transformer 86 is provided, having a primary winding 87 connected across the source of energy and excited in phase therewith and a secondary winding 88 which is connected in series circuit with the winding 12 of the converter 8. Thus, an out-of-phase voltage is impressed upon the circuit including the converter winding 12 which combines with the voltage of said winding to compensate for phase distortion and to cause the voltage of that phase to be substantially in quadrature with that of the secondary winding 81 under load conditions.

In order to avoid the necessity of an auxiliary transformer for compensating purposes, it is possible, under certain circumstances, to merely employ an auxiliary secondary transformer winding 90 which is connected in circuit with the winding 12 of the converter 8, as shown in Fig. 7.

In Fig. 8, a single main secondary winding 93 is provided for energizing the exciting winding 7 of the converter 8 and for supplying energy to one phase of the motor windings (not shown). The other winding 12 of the phase converter 8 is connected in circuit with an auxiliary transformer secondary winding 90, in a manner similar to that set forth in connection with the Fig. 7.

The system shown in Fig. 9 is similar in many respects to that set forth in Fig. 8, except that the exciting winding 7 and the winding 12 of the phase converter 8 are interconnected, and a portion 95 of the secondary transformer winding 93 is adapted to be connected in circuit with the converter winding 12 by means of an adjustable switching device 96, whereby a single secondary transformer winding may serve in common to compensate for phase displacement of the phase converter, as well as to excite the phase converter and to supply energy to one phase of the motor windings. By thus utilizing a single transformer winding to perform these several functions, the copper losses are reduced and a simplification of circuits and adjustments is effected.

Other modifications in the arrangements of circuits and apparatus and in the mode of operation may be effected within the spirit and scope of my invention.

I claim as my invention:

1. The combination with a source of energy having a plurality of intermediate taps, of a phase converter having a plurality of windings in quadrature relation, one of said windings being connected across said source, and means for connecting the other winding to any of said intermediate taps.

2. The combination with a source of single-phase energy, a transformer connected thereto, a phase converter having a plurality of independent windings, one of which is connected across said transformer, the other of said converter windings being connected to an intermediate point of said transformer to produce three-phase energy, of poly-phase translating means adapted to be operated by the three-phase energy, and means for shifting the intermediate transformer connection to effect balanced operation of said translating means.

3. The combination with a single-phase source of energy, a transformer comprising primary and secondary windings, and a phase converter having a plurality of windings in quadrature relation, one of which is connected across said secondary transformer winding, of means associated with said secondary winding and with the circuit of the other converter winding for correcting phase distortion in said converter.

4. The combination with a transformer winding adapted for single-phase energy and polyphase translating means, of a phase converter interposed between said transformer winding and said translating means for converting single phase energy into polyphase energy and adjustable means associated with said transformer winding and with said phase converter for correcting the phase displacement of said phase converter under varying load conditions.

5. The combination with a source of energy, a phase converter having a plurality of independent windings in quadrature relation, one of said windings being excited from said source and the other being connected to substantially the mid-point of said source, and a polyphase load, of means for varying the excitation of said converter and means for correcting the phase displacement thereof under load conditions.

6. The combination with a single-phase alternating current circuit and polyphase translating means, of phase-converting means interposed between said single phase circuit and said translating means and means for varying the excitation and correcting the phase displacement of said converting means under varying load conditions.

7. The combination with a source of single-phase energy, a phase converter having a plurality of independent windings in quadrature and operative relationship, one of said windings being excited from said source of energy, polyphase translating means, of means respectively in circuit with said exciting winding and the remaining winding of said converter for respectively varying the voltage and the phase position of the energy delivered by said second converter winding.

8. The combination with a single-phase source of energy, a phase converter having an exciting winding connected across said source and a second winding associated with said source and adapted, under normal conditions, to deliver voltage in quadrature with said source and of a predetermined value, and a polyphase load, of adjustable switching means in circuit with the respective converter windings for varying the value and the phase position of the voltage delivered thereby.

9. The combination with a source of single phase energy, a phase converter having a plurality of windings in quadrature relation, one of said windings being connected across said source, and the other being connected to substantially the mid-point of said source whereby balanced three-phase voltages are obtained, and polyphase translating means of means for shifting the mid-point connection to one side or the other of said mid-point to maintain balanced voltages under load conditions.

10. The combination with a single phase source of energy, a phase converter associated therewith, and polyphase translating means adapted to receive energy from said converter, of means for shifting connections external to said converter for effecting balanced operating conditions when said translating means is under load.

In testimony whereof, I have hereunto subscribed by name this 20th day of Dec., 1913.

BENJAMIN G. LAMME.

Witnesses:
E. LIVINGSTONE,
B. B. HINES.

Copies of this patent may be obtained for five cents each, by addressing the "Commissioner of Patents, Washington, D. C."